United States Patent
Connolly et al.

(10) Patent No.: US 9,680,588 B2
(45) Date of Patent: Jun. 13, 2017

(54) OTN SWITCHING SYSTEMS AND METHODS USING AN SDN CONTROLLER AND MATCH/ACTION RULES

(71) Applicants: Matthew W Connolly, Alpharetta, GA (US); John K Oltman, Chamblee, GA (US)

(72) Inventors: Matthew W Connolly, Alpharetta, GA (US); John K Oltman, Chamblee, GA (US)

(73) Assignee: Ciena Corporation, Hanover, MD (US)

( * ) Notice: Subject to any disclaimer, the term of this patent is extended or adjusted under 35 U.S.C. 154(b) by 157 days.

(21) Appl. No.: 14/301,728

(22) Filed: Jun. 11, 2014

(65) Prior Publication Data
US 2015/0365193 A1    Dec. 17, 2015

(51) Int. Cl.
*H04L 12/28*    (2006.01)
*H04J 3/16*    (2006.01)
(Continued)

(52) U.S. Cl.
CPC ............ *H04J 3/1652* (2013.01); *H04J 3/12* (2013.01); *H04L 41/0803* (2013.01); *H04L 45/12* (2013.01); *H04L 45/42* (2013.01); *H04L 45/72* (2013.01); *H04L 45/745* (2013.01); *H04Q 11/0066* (2013.01); *H04J 2203/0051* (2013.01);
(Continued)

(58) Field of Classification Search
CPC ......... H04L 45/02; H04L 41/12; H04B 10/04; H04B 10/27
See application file for complete search history.

(56) References Cited

U.S. PATENT DOCUMENTS

| | | |
|---|---|---|
| 8,259,733 B2 | 9/2012 | Conklin et al. |
| 8,509,113 B2 | 8/2013 | Connolly et al. |

(Continued)

FOREIGN PATENT DOCUMENTS

CN    103685033 A    3/2014

OTHER PUBLICATIONS

Jain, Raj, "Introduction to OpenFlow," http://www.cse.wustl.edu/~jain/cse570-13/, Washington University in Saint Louis, 2013, slides 1-46.

(Continued)

*Primary Examiner* — Alvin Zhu
(74) *Attorney, Agent, or Firm* — Clements Bernard Walker PLLC; Christopher L. Bernard; Lawrence A. Baratta, Jr.

(57) ABSTRACT

A method and network include receiving a Time Division Multiplexing (TDM) connection; determining information in overhead of the TDM connection; and if match/action rules defined by controller exist for the TDM connection, establishing the TDM connection based on matching an associated rule in the match/action rules. A Software Defined Networking (SDN) controller is configured to receive a request from a node related to a new TDM connection in the network; determine one or more routes in the network for the new TDM connection; determine match/action rules for the one or more routes at associated nodes of the one or more nodes; if the one or more routes include at least two routes, determine a group table at associated nodes of the one or more nodes to distinguish between the at least two routes; and provide the match/action rules and the group table to the associated nodes.

15 Claims, 8 Drawing Sheets

(51) Int. Cl.
*H04L 12/24* (2006.01)
*H04L 12/721* (2013.01)
*H04L 12/741* (2013.01)
*H04Q 11/00* (2006.01)
*H04J 3/12* (2006.01)
*H04L 12/717* (2013.01)

(52) U.S. Cl.
CPC ............... *H04J 2203/0058* (2013.01); *H04Q 2011/0033* (2013.01); *H04Q 2011/0073* (2013.01); *H04Q 2011/0081* (2013.01)

(56) References Cited

U.S. PATENT DOCUMENTS

| | | | |
|---|---|---|---|
| 8,559,812 B2 | 10/2013 | Oltman et al. | |
| 8,665,699 B2 | 3/2014 | Bellagamba et al. | |
| 2012/0230674 A1* | 9/2012 | Yuan | H04J 3/14 398/17 |
| 2012/0257903 A1* | 10/2012 | Taniguchi | H04J 3/1652 398/182 |
| 2013/0028142 A1 | 1/2013 | Beheshti-Zavareh | |
| 2013/0114953 A1 | 5/2013 | Moynihan et al. | |
| 2013/0142509 A1 | 6/2013 | Connolly et al. | |
| 2014/0149542 A1* | 5/2014 | Luo | H04L 45/02 709/217 |
| 2015/0103671 A1* | 4/2015 | Ernstrom | H04L 41/0659 370/238 |
| 2015/0215914 A1* | 7/2015 | Cho | H04W 28/10 370/235 |
| 2015/0249572 A1* | 9/2015 | Mack-Crane | H04L 47/20 709/222 |

OTHER PUBLICATIONS

"OpenFlow Switch Specification," The Open Networking Foundation, Sep. 27, 2013, pp. 1-164.
"OTWG," slides 1-8.

* cited by examiner

36

| | 1 | 2 | 3 | 4 | 5 | 6 | 7 | 8 | |
|---|---|---|---|---|---|---|---|---|---|
| PSI[2] | ODTU TYPE | | TRIBUTARY PORT # | | | | | | TS1 |
| PSI[3] | ODTU TYPE | | TRIBUTARY PORT # | | | | | | TS2 |
| PSI[4] | ODTU TYPE | | TRIBUTARY PORT # | | | | | | TS3 |
| PSI[5] | ODTU TYPE | | TRIBUTARY PORT # | | | | | | TS4 |
| PSI[6] | ODTU TYPE | | TRIBUTARY PORT # | | | | | | TS5 |
| ⋮ | ⋮ | | ⋮ | | | | | | ⋮ |
| ⋮ | ⋮ | | ⋮ | | | | | | ⋮ |
| PSI[33] | ODTU TYPE | | TRIBUTARY PORT # | | | | | | TS32 |

| | 1 | 2 | 3 | 4 | 5 | 6 | 7 | 8 | |
|---|---|---|---|---|---|---|---|---|---|
| PSI[1+i] | ODTU TYPE | | TRIBUTARY PORT # | | | | | | TS#i |

00: ODTU13
01: ODTU23
10: ODTU3.ts
11: UNALLOCATED 00 0000: TRIBUTARY PORT 1
00 0001: TRIBUTARY PORT 2
00 0010: TRIBUTARY PORT 3
00 0011: TRIBUTARY PORT 4
⋮
01 1111: TRIBUTARY PORT 32

FIG. 3

OTN SWITCHING SYSTEMS AND METHODS USING AN SDN CONTROLLER AND MATCH/ACTION RULES

FIELD OF THE DISCLOSURE

The present disclosure relates generally to networking systems and methods. More particularly, the present disclosure relates to Optical Transport Network (OTN) switching systems and methods using a Software Defined Networking (SDN) controller and match/action rules.

BACKGROUND OF THE DISCLOSURE

Common standards for automatically switched OTN (G.709) networks include Automatically Switched Optical Networks (ASON) G.7715 and Generalized Multiprotocol Label Switching (GMPLS). These rely on link state routing protocols (e.g., Open Shortest Path First (OSPF)) and protocols such as Resource Reservation Protocol-Traffic Engineering (RSVP-TE) for circuit setup. Each node maintains the link state of the network and routes are computed at the source node based on least cost or some other criteria. Strict adherence to standards is required for interoperability between vendors. All of these run either over a dedicated in-band communication channel (e.g., General Communication Channel (GCC) in OTN) or out of band through a data communication network (DCN). Each node must maintain protocol stacks for the routing and signaling. A recent development in switching is SDN and an exemplary protocol is OpenFlow (www.openflow.org). OpenFlow targets packet technology such as Internet Protocol (IP) and Ethernet. OpenFlow separates a control plane and data plane and relies on a centralized controller to compute routes and program switches. OpenFlow and SDN provide some advantages over legacy switching such as rapid service introduction through customization, flexibility in how the network is used and operated, less reliance on lengthy standardization process for new innovations, open interfaces, etc.

OpenFlow programs match/action rules into switches. A match/action rule looks for a specific bit field in the packet/frame overhead and specifies an action upon match (forward, drop, and/or modify). Unknown packets are (by default) forwarded to the controller. Routing and rule provisioning is done by the controller. For example, OpenFlow with an SDN controller could replace traditional IEEE 802.1d Media Access Control (MAC) learning and forwarding. If a frame with an unknown destination address (DA) is received by a switch it is forwarded to the controller. The controller might determine a least cost path to the DA and then populate match/action forwarding rules into a forwarding database (FDB) on all of the network elements in the path. The network element needs no intelligence beyond matching the DA of the frame and forwarding to the port specified in the forwarding table. The above works well for packets but there is no obvious way to extend this to OTN. OTN (like SONET/SDH) requires a bit synchronous stream multiplexed on fixed time slots in a time division multiplexing (TDM) structure. OTN does not have the same lookup store and forward properties as packets, making it difficult to take full advantage of a protocol like OpenFlow. There are no solutions in the standards (or being proposed) for setting up connections with simple match/action rules for OTN as is done with Ethernet or other packet technologies. OTN efforts in the OpenFlow community are focused on porting the G.798 transport functional models to OpenFlow and creating the corresponding objects on the network elements. This approach is limited to using OpenFlow as a replacement for current provisioning interfaces and does not fully exploit OpenFlow's advantages mentioned herein.

BRIEF SUMMARY OF THE DISCLOSURE

In an exemplary embodiment, a method includes receiving a Time Division Multiplexing (TDM) connection; determining information in overhead of the TDM connection; and if match/action rules defined by a Software Defined Networking (SDN) controller exist for the TDM connection, establishing the TDM connection based on matching an associated rule in the match/action rules with the information. The method can further include establishing the TDM connection by creating cross-connects for the TDM connection based on the match/action rules. The method can further include, if match/action rules do not exist for the TDM connection, sending a request to the SDN controller for the SDN controller to determine a path and provide the match/action rules. The method can further include, subsequent to the sending the request, receiving the match/action rules from the SDN controller; and creating cross-connects for the TDM connection based on the match/action rules. The method can further include subsequent to the establishing, utilizing a group table to implement protection of the TDM connection at end nodes.

The method can further include determining source and destination addressing based on the information in the overhead, wherein the information comprises a trail trace in the TDM connection. The TDM connection can include an Optical Transport Network (OTN) connection. The information can include a Trail Trace Identifier (TTI) and associated fields including a Source Access Point Identifier (SAPI) and a Destination Access Point Identifier (DAPI). The associated fields can further include an Operator Specific field used to specify a route in the network. The information can include a Multiplex Structure Identifier (MSI) table, and the method can further include detecting a new connection based on a presence of new data in the MSI table denoting a connection rate and tributary port number. The SDN controller can utilize OpenFlow. The TDM connection can include a Synchronous Optical Network (SONET) or Synchronous Digital Hierarchy (SDH) connection.

In another exemplary embodiment, a controller includes a network interface communicatively coupled to one or more nodes in a network; a processor communicatively coupled to the network interface; and memory storing instructions that, when executed, cause the processor to: receive a request from a node related to a new Time Division Multiplexing (TDM) connection in the network; determine one or more routes in the network for the new TDM connection; determine match/action rules for the one or more routes at associated nodes of the one or more nodes; if the one or more routes include at least two routes, determine a group table at associated nodes of the one or more nodes to distinguish between the at least two routes; and provide the match/action rules and the group table if the one or more routes include the at least two routes to the associated nodes. The controller can include a Software Defined Networking (SDN) controller. The SDN controller can utilize OpenFlow. The new TDM connection can include an Optical Transport Network (OTN) connection. The new TDM connection can include a Synchronous Optical Network (SONET) or Synchronous Digital Hierarchy (SDH) connection.

In yet another exemplary embodiment, a network includes a plurality of nodes; a plurality of links interconnecting the nodes via Time Division Multiplexing (TDM); and a controller communicatively coupled to one or more of the plurality of nodes; wherein each of the plurality of nodes are configured to: receive a Time Division Multiplexing (TDM) connection; determine information in overhead of the TDM connection; if match/action rules exist for the TDM connection, establish the TDM connection based on matching an associated rule in the match/action rules with the information; and if match/action rules do not exist for the TDM connection, send a request to the controller for the controller to determine a path and provide the match/action rules. The controller is configured to: receive the request related to a new Time Division Multiplexing (TDM) connection in the network; determine one or more routes in the network through associated nodes of the plurality of nodes for the new TDM connection; determine match/action rules for the one or more routes; if the one or more routes comprise at least two routes, determine a group table to distinguish between the at least two routes; and provide the match/action rules and the group table if the one or more routes comprise the at least two routes to the associated nodes. The controller can include a Software Defined Networking (SDN) controller.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of an exemplary MSI structure for an ODU3;

DETAILED DESCRIPTION OF THE DISCLOSURE

Figure 1:
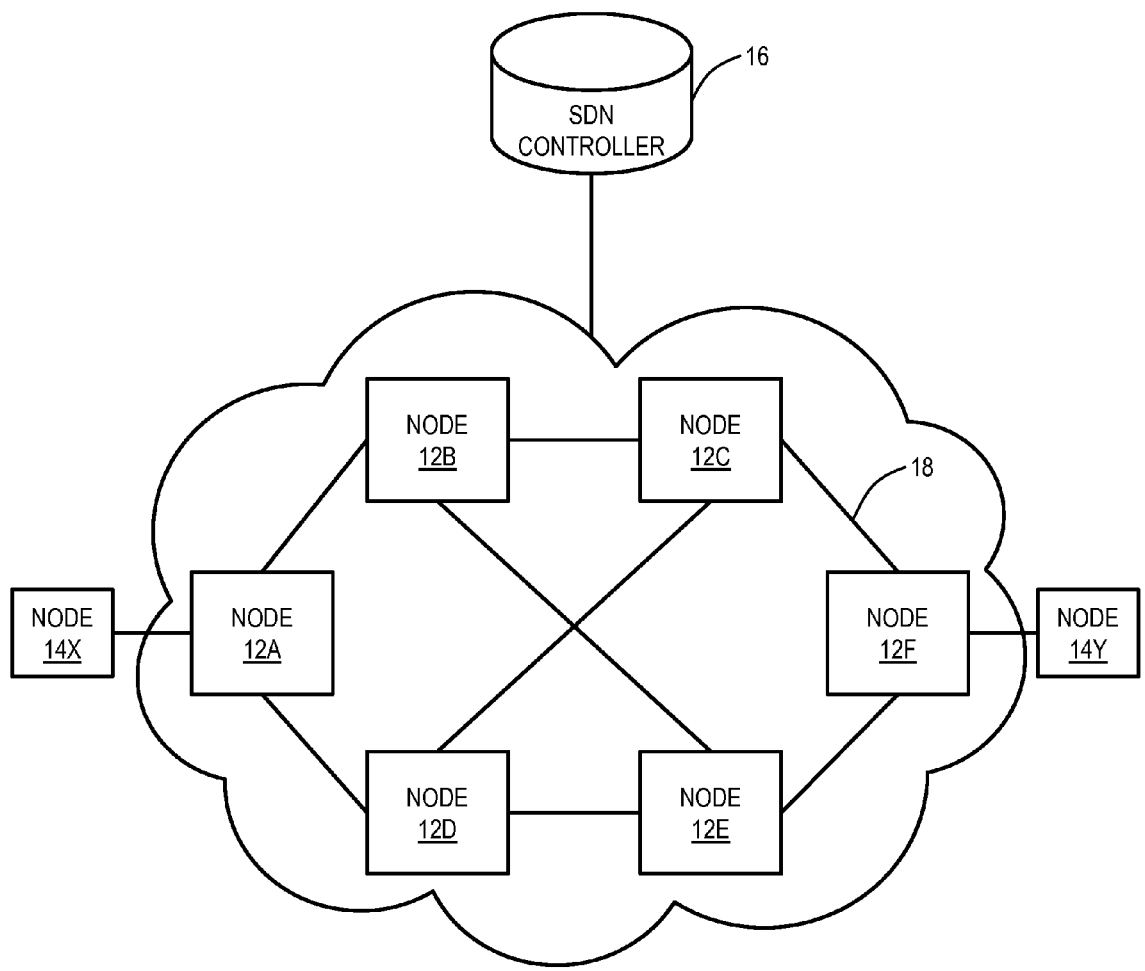
FIG. 1 is a network diagram of a network with interconnected nodes.

In various exemplary embodiments, OTN switching systems and methods using an SDN controller and match/action rules are disclosed. The OTN switching systems and methods the SDN controller to apply match/action rules to automatically switch connections in a G.709 OTN network. The OTN switching systems and methods perform Optical channel Data Unit (ODU) ODU circuit switching based on matching an OTN overhead value to a forwarding rule, where the OTN overhead value represents the end-point of a circuit. An exemplary implementation could use the standard G.709 OTN Trail Trace Identifier (TTI). The OTN TTI fields have two parts: a Source Access Point Identifier (SAPI) and a Destination Access Point Identifier (DAPI). This is somewhat analogous to the use of Source/Destination MAC address forwarding of Ethernet frames. The SDN controller can calculate routes using end-to-end path SAPI/DAPI values—operator specific fields can also be included. The SDN controller programs the TTI match/action tables into switches in a network, and this applies to circuit creation and protection switching. Note, while the OTN switching systems and methods are described herein with reference to OpenFlow; the OTN switching systems and methods contemplate use with any SDN protocol and with any TDM technology such as Synchronous Optical Network (SONET), Synchronous Digital Hierarchy (SDH), etc.

The advantages of this approach are: M:N protection capability, low overhead, and light weight processing on the network element using simple matching rules derived from standard G.709 overhead information, etc. The OTN switching systems and methods leverage SDN concepts and can be implemented via extensions to OpenFlow (or similar). The OTN switching systems and methods attempt to leverage the existing mechanisms in OpenFlow to handle packet forwarding, but applied to OTN. The OTN switching systems and methods are low cost in terms of minimal processing on the network elements, i.e., a simple look-up with some hierarchy using group tables for protection, low message overhead to the SDN controller, and could work with existing OTN systems (i.e., software-only implementation). The OTN switching systems and methods provide excellent performance in terms of fast switching and scaling. For fast switching, since switching decisions are local, no signaling is required in the network. For scaling, since TTI fields are relatively large (16 bytes for DAPI, 64 bytes for entire TTI), there is an ability to scale. Finally, the OTN switching systems and methods are simple to implement with no modifications required to the G.709 data plane, auto-Multiplex Structure Identifier (MSI) functions and TTI match functions are already supported by most OTN hardware, and decision to create cross-connect is local and the logic is not complex: <match/action table entry exists and valid matching tributary is being received>. Also, performance and scalability are high since signaling is not required to restore circuits.

Figure 8:
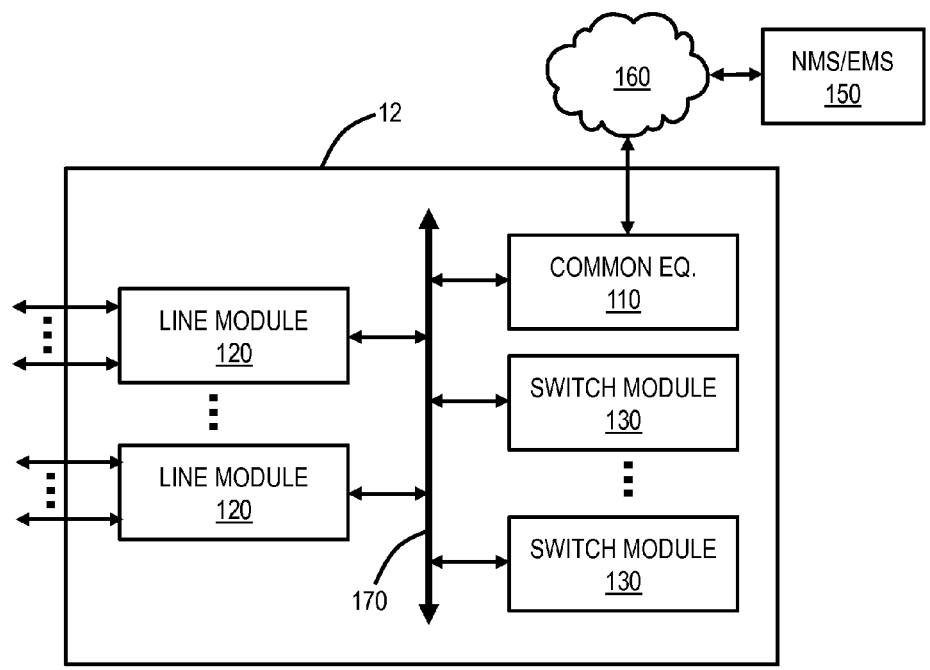
FIG. 8 is a block diagram of an exemplary node for use with the systems and methods described herein.
Figure 9:
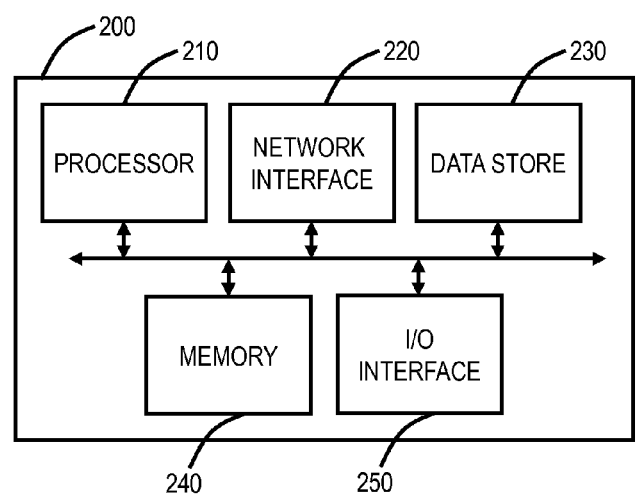
FIG. 9 is a block diagram of a controller to provide control plane processing and/or operations, administration, maintenance, and provisioning (OAM&P) for the node or to act as the SDN controller.

Referring to FIG. 1, in an exemplary embodiment, a network diagram illustrates a network 10 with interconnected nodes 12 (referred to as node 12A, 12B, 12C, 12D, 12E, 12F). The network 10 further includes two client nodes 14X, 14Y and an SDN controller 16 communicatively coupled to the nodes 12. The nodes 12 are interconnected by various links 18 which are OTUk links, i.e., OTN links. The network 10 is presented for illustration of the OTN switching systems and methods. Those of ordinary skill in the art will recognize the OTN switching systems and methods contemplate various network configurations, topologies, etc. The nodes 12 are OTN switching network elements, and an exemplary implementation is illustrated in FIG. 8. The SDN controller 16 can utilize OpenFlow or another similar protocol, and an exemplary implementation is illustrated in FIG. 9. The nodes 14X, 14Y can be any type of network element that utilize OTN between one another. In the various examples described herein, an OTN circuit setup is described between the nodes 14X, 14Y using the SDN controller 60.

As described herein, a very useful element of packet networks as they apply to OpenFlow-based provisioning is the ability to pre-install match/action rules across the network to establish a path through the network which a given flow takes. The provisioning of such rules can be applied without consuming any resources in the network. Essentially the bandwidth along the path only gets used when a packet is sent. This readily lends itself to pre-provisioning protection paths in the network which may be shared by multiple connections which experience diverse shared risk along their nominal path. Packet networks may further benefit from oversubscription of the same BW even while packets are being sent. Again, in contrast, traditional circuit switched networks such as OTN or SONET/SDH establish cross connects which consume resources even when no traffic is being sent. Without the aid of signaling, a protected connection generally consumes bandwidth on both the working and protect routes through the network.

Figure 2:
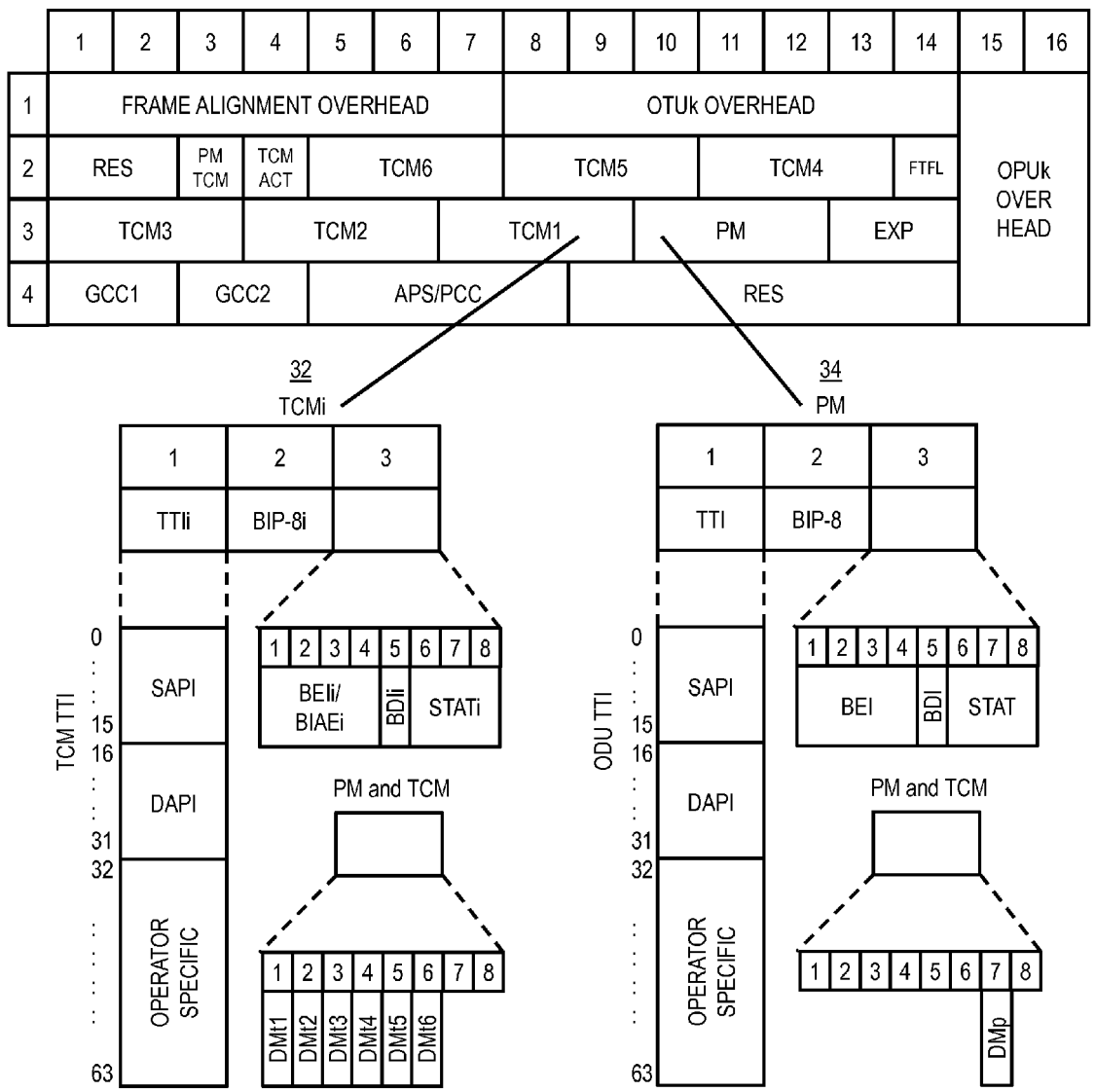
FIG. 2 is a block diagram of overheard of an ODU/OTU frame.

Referring to FIGS. 2-3, in an exemplary embodiment, block diagrams illustrate overheard 30 of an ODU/OTU frame (FIG. 2) and an exemplary MSI structure 40 for an ODU3 (FIG. 3). The overhead 30 include frame alignment overhead (row 1, col. 1-7), OTUk overhead (row 1, col. 8-14), Optical channel Path Unit k (OPUk) overhead (rows 1-4, col. 15-16), reserved bytes (row 2, col. 1-2, row 4, col. 9-14), Path Monitoring (PM) Tandem Connection Monitoring (TCM) (row 2, col. 3), TCM Activation/deactivation control channel (TCM ACT) (row 2, col. 4), TCMs 1-6 (row. 2, cols. 5-13, row 3, col. 1-9), Fault Type & Fault Location reporting channel (FTFL) (row 2, col. 14), PM (row 3, col-10-12), Experimental (EXP) (row 3, col. 12-14), General Communication Channels 1 and 2 (GCC1, GCC2) (row 4, col. 1-4), and Automatic Protection Switching coordination channel (APS)/Protection Communication Control channel (PCC) (row 4, col. 5-8). For illustration, additional details are illustrated for ODUk TCM #i overhead 32 (Figure 15-14/G.709) and ODUk PM overhead 34 (Figure 15-13/G.709). Note, there are six of the ODUk TCM #i overhead 32 for i=1 to 6. Details of the overhead 30, 32, 34 are described further in Rec. ITU-T G.709/Y.1331 "Interfaces for the optical transport network" (February 2012), the contents of which are incorporated by reference herein.

For the overhead 34, there is a TTI in col. 1, and for the overhead 32, there is a TTIi (i=1-6) in col. 1. The TTI is a 64-Byte signal that occupies one byte of the frame and is aligned with the OTUk multiframe. It is transmitted four times per multiframe. For the overhead 34, there is a bit interleaved parity-8 (BIP-8) in col. 2, and for the overhead 32, there is a BIP-8i (i=1-6) in col. 1. Finally, for the overhead 34, there is a Backward Error Indication and Backward Incoming Alignment Error (BEI/BIAE) in col. 3 and sub-columns 1-4, a Backward Defect Indication (BDI) in col. 3 and sub-column 5, and a Path Monitoring Status (STAT) in col. 3, sub-columns 6-8. For the overhead 32, there is a BEIi/BIAEi TTIi (i=1-6) in col. 3 and sub-columns 1-4, a Backward Defect Indication (BDIi) (i=1-6) in col. 3 and sub-column 5, and a TCM Monitoring Status (STATi) (i=1-6) in col. 3, sub-columns 6-8.

An objective of the OTN switching systems and methods is to bring the ability to preprovision paths for circuited switched connections which are dynamically activated and deactivated across a network topology based on the presence of a given connection in terms of using a source/destination addressing along with information to specify the desired route through the network. In circuit switched networks, there is generally not the concept of the circuit itself carrying a source and destination address which is used to dynamically create a route through the network. There is the concept of Trail Trace such as that found in SONET/SDH (J0/J1 bytes) or OTN (TTI) that is used to validate that the correct connection has arrived at its destination or for the purposes of adjacency discovery.

In various exemplary embodiments, the OTN switching systems and methods propose to use these Trail Trace concepts to include within the overhead of a circuit switched connection a unique source and destination address which can be abstractly thought of as a MAC or IP address which defines the source and destination connection points for the circuit. In addition to the source and destination address, a concept is borrowed from Provider Backbone Bridge Traffic Engineering (PBB-TE) where further information is optionally supplied to specify one or more routes which this connection can take to reach the destination. In PBB-TE, the Backbone MAC (B-MAC) provides the source and destination address, while the Backbone Virtual Local Area Network Identifier (B-VID) defines the route to take from source to destination. When applied to OTN, reserved overhead could be also be used to carry this information, but existing deployed hardware may have issue in accessing those fields.

In an exemplary embodiment, an implementation choice here is to use the existing Trail Trace Identifier overhead to include the source and destination address along with the desired route to take through the network. Topology for the OTN network can be determined by OTUk TTI, or some other method. Routes are computed by the SDN controller 16 and match/action tables are programmed into the nodes 12. The node 12 automatically creates a cross-connect when an ODUj/ODUjT signal is received that has a valid match/action entry. In this example, the ODUj TTI address is used to identify the end-to-end circuit. TCM TTI addresses are used to identify the different routes for the circuit. And the TCM terminations also act as MEPs for fault management. Again, the TTI field within OTN is defined to carry a 64 byte string of information which is mapped over a multi-frame structure. The TTI can be used to carry a network wide unique identifier of the source and destination end points of this connection along with information to identify the route by which this connection should be forwarded through the network.

For example, each of the SAPI and DAPI fields are 16 bytes in length which can be treated as network unique endpoint identifier. If encoded in hexadecimal form, addresses in the range from 00-00-00-00-00-00-00-00 to FF-FF-FF-FF-FF-FF-FF-FF or the equivalent of a 64 bit address can be realized. The operator specific provides an additional 32 characters of information where even four characters could identify 64K unique routes. Example TTI: SAPI=<Source Address>, DAPI=<Dest Address>, Operator Specific=<Route>, <User>. Additional fields can be envisioned which could include things like priority. Source/Destination addressing can be considered as a unique end point or can be administered in the network to allow for the definition of sub-networks where it may be desirable to forward traffic based on a partial match of the destination address.

Within the overhead of a HO ODUk exists overhead referred to as the Multiplex Structure Identifier or MSI table. For example, FIG. 3 illustrates an MSI table 36 for OPU3 MSI coding. The MSI table has an entry for each tributary slot of the interface. The values represented in the MSI table indicate whether a tributary slot is unallocated or in use by a given connection and that connection's rate. For example, an ODU2 connection be mapped into an ODU4 would mark eight tributary slots as in use by an ODU2 along with an added identification known as the tributary port number. The tributary port number uniquely identifies the ODU2 from other such connections on the interface. This information can be used to identify the presence of a new connection on the line as the MSI is populated by an upstream node from unallocated to a valid connection rate and tributary port number. The OTN network link terminations are configured to accept all valid standard G.709 Multiplex Structure Identifier (MSI) entries. Note: MSI information is part of the ODUk overhead and contains the multiplex information for all ODUj tributaries in the parent ODUk. An MSI entry can include: ODTU type, ODUj tributary port#, and the ODUk tributary-slots for the given ODUj path or Subnetwork Connection (SNC).

Once a new connection is discovered on the interface through detection of a change in the MSI table, the hardware can now frame to the new connection and access the overhead specific to that ODU connection and access the TTI fields of both the Tandem Connection Monitor (TCM) and Path Monitor (PM) layers. Through extensions to OpenFlow provisioning or the like, the SDN 16 controller can provision match/action rules on the nodes 12. A plurality of match/action rules can be provisioned on the node 12. These match/action rules can be on the node 12, interface, or logical interface such as found in an aggregated link. When a new connection is discovered on an interface, its TTI is accessed and applied as match criteria. If a match is found, the resulting action can be used to dynamically create a cross connect via the action rules.

The action can be abstracted to forward to an interface without the need to specify the physical port, time slot, and tributary port number. As described herein, to forward means to send a connection on to a next node on an existing cross-connect or to create the cross-connect if needed. If desired, that information can be locally defined on the node 12 and can be simplex in nature, i.e., does not specifically have to be coordinated with the far end node on the link. A resulting benefit is that the SDN controller 16 does not have to be consulted to explicitly coordinate bandwidth usage on the interface in response to dynamic changes in the network. For example, both end-to-end and Fast Reroute (FRR) types of protection mechanisms can be handled autonomously by the nodes 12 in response to failures based on the pre-provisioning by the SDN controller 16 of alternate routes.

Figure 4:
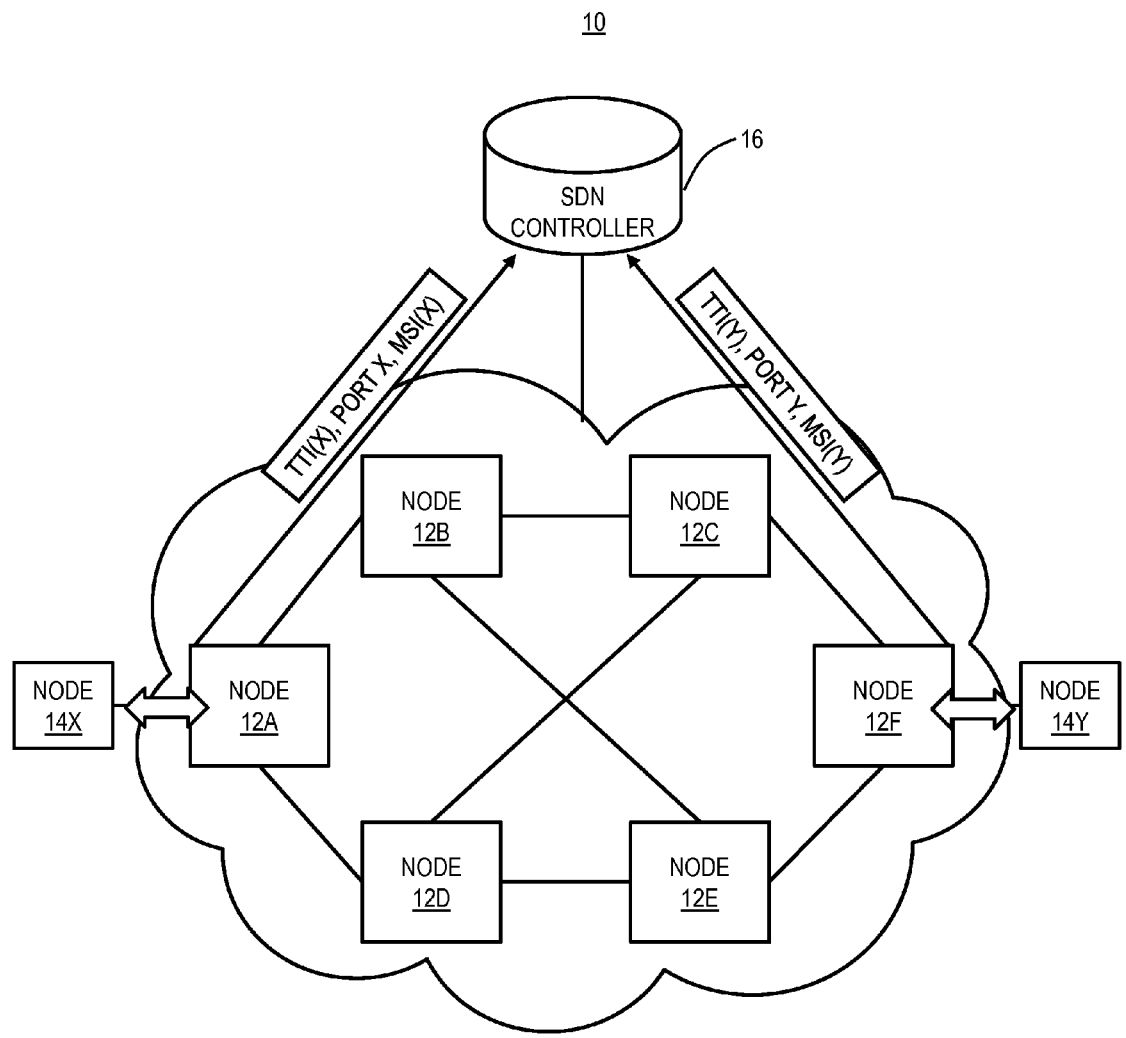
FIG. 4 is a network diagram of the network of FIG. 1 with illustrating initiation of an exemplary connection between two nodes through the SDN controller.
Figure 5:
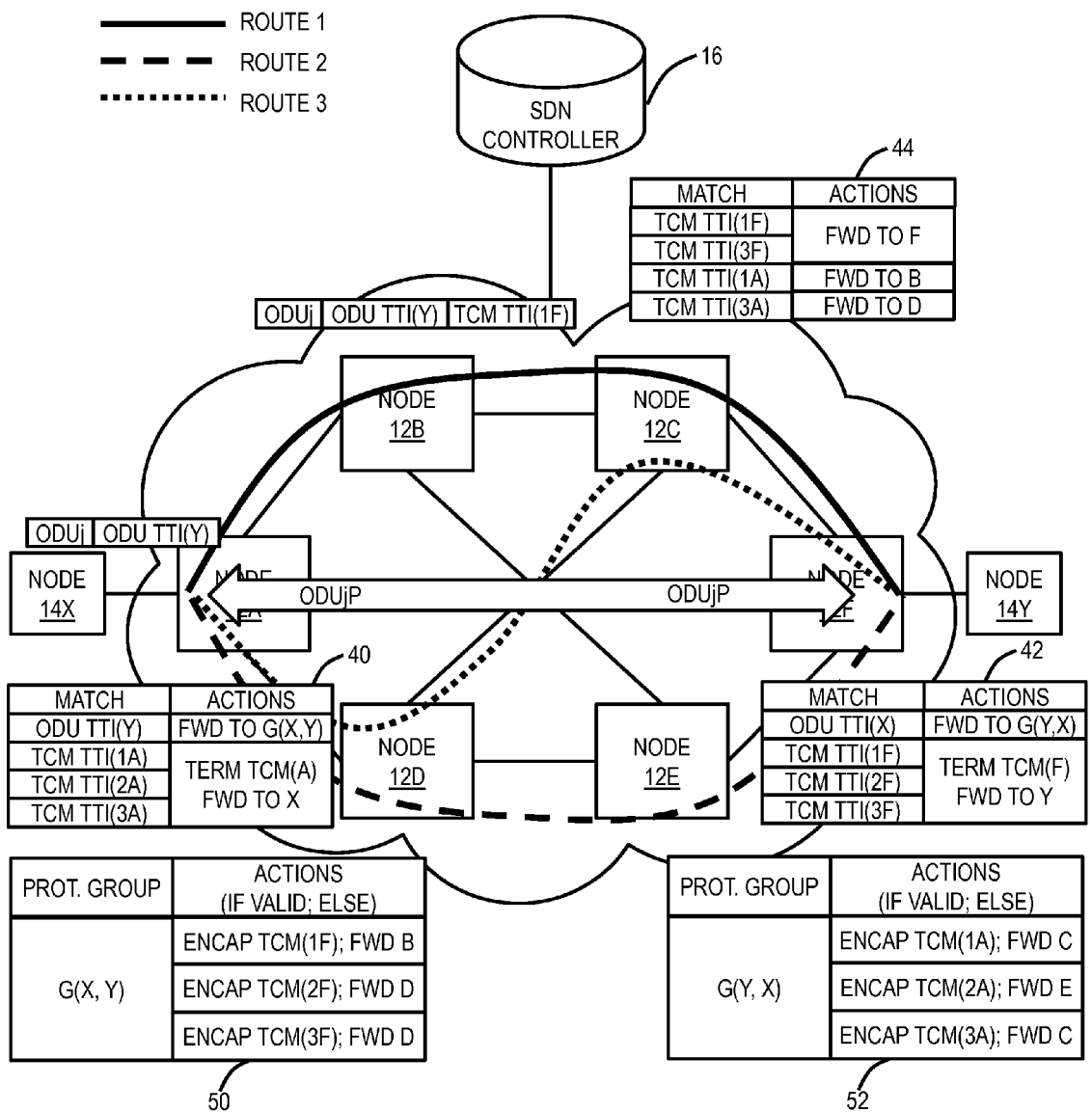
FIG. 5 is a network diagram of the network of FIGS. 1 and 4 illustrated match/action rules from the SDN controller for creating/switching the exemplary connection.

Referring to FIGS. 4-5, in an exemplary embodiment, a network diagram illustrates the network 10 with the interconnected nodes 12 (referred to as node 12A, 12B, 12C, 12D, 12E, 12F) illustrating an exemplary connection between the nodes 14X, 14Y through the nodes 12 using match/action rules on OTN connections. In this example, the nodes 14X, 14Y want to communicate with one another, and the SDN controller 16 is used to set up the connection in the nodes 12 via match/action rules. For illustration purposes, the connection is an ODUj between the nodes 14X, 14Y is a multiplexed connection occupying tributary ports in a larger ODUk. Those of ordinary skill in the art will recognize the same techniques described herein can also apply to mapped signals as well.

First, in FIG. 4, the node 14X communicates the connection to the node 12A and the nodes 14Y communicates the connection (i.e., the connection is bidirectional) to the node 12F. In this case, this is a new connection, i.e., the nodes 12A, 12F do not have corresponding match/action rules for this connection and no cross-connects are established. A match/action table for this can be summarized as follows: Match/Action Table to Identify/Learn New Circuit (Applied at all Nodes)

| Match | Action |
| --- | --- |
| Valid MSI entry [ODTU, Trib Port#] but with Unknown* ODU TTI on Port X | Send circuit endpoint information to SDN controller 16: [TTI, Port#, Rate, MSI Trib Port(i)] |

*where "Unknown" means there is nothing already in the local tables for ODU TTI

Here, the node 12A sends the information to the SDN controller 16. The SDN controller 16 receives and stores circuit endpoint information from the node 12A including ODU TTI [SAPI(X), DAPI(Y)] sent from node A and attempts to match it with a corresponding TTI [SAPI(Y), DAPI(X)]. When the corresponding TTI information is received at the SDN controller from the node 12F, the controller calculates one or more routes for the ODUj circuit (X, Y) from node A to node F. The SDN controller 16 can use any technique to compute the route as is known in the art. For example, the SDN controller 16 computes the following three routes:

| | |
| --- | --- |
| Route 1 | Node 12A, 12B, 12C, 12F |
| Route 2 | Node 12A, 12D, 12E, 12F |
| Route 3 | Node 12A, 12D, 12C, 12F |

Note: Learning at the end-points only applies to ODUj clients. For Ethernet or other clients being mapped into an OTN connection at the nodes 12A, 12F, the SDN controller 16 can create the end-points and determine the ODU TTI for the end-points based on other inputs.

Once the routes are calculated the switching match/action rules are sent from the SDN controller 16 to the terminating and intermediate nodes 12. A rule is assigned for each route in each direction. Forwarding is based on the Destination field in the TTI. For multiple routes (i.e. protection), a group table is defined. The Terminating Node Match/Action Table for the node 12A could be as follows:

| Match | Actions |
| --- | --- |
| ODU TTI(Y) | Forward to Group Table G(X, Y) |
| TCM TTI(1A) | Terminate TCM, Forward to Port X, Trib Port(i) |
| TCM TTI(2A) | NETWORK SIDE FOR THE OPPOSITE DIRECTION |
| TCM TTI(3A) | |

Here, the ODU TTI(Y) is the incoming ODUj from the node 14X destined for the node 14Y and the action is to forward to a group table, G(X, Y). The TCM TTI(1A), TCM TTI(2A), TCM TTI(3A) represent the opposite direction from the node 14Y—one for each of the routes defined by the SDN controller 16. The group table, G(X, Y) for fast failover for the node 12A could be as follows:

| Group ID | Actions |
| --- | --- |
| G(X, Y) | Bucket 1: If Route 1 is valid write: TCM with TTI(Dest = F, Route = 1) Forward to the node 12B; ELSE goto Bucket 2 Bucket 2: If Route 2 is valid write: TCM with TTI(Dest = F, Route = 2) Forward to node 12D; ELSE goto Bucket 3 Bucket 3: If Route 3 is valid write: TCM with TTI(Dest = F, Route = 3) Forward to the node 12D; ELSE . . . |

Thus, protection at the node 12A (and other nodes 12) is simply implemented by match/action rules in a group table. Also, there can be more than three routes. Note, the match/action rules and group table for the node 12F is similar as above for the node 12A but with different nodes 12. Additionally, the SDN controller 16 can provide match/action rules for each of the intermediate nodes 12 as well. For example, the Intermediate Node Rules can include the following for the node 12C as an example—
Intermediate Node Switching Match/Action Table: Switches on TCM TTI (Node C Example)

| Match | Actions |
|---|---|
| TCM TTI(Dest = F, Route = 1) | Forward to the node 12F |
| TCM TTI(Dest = F, Route = 3) | |
| TCM TTI(Dest = A, Route = 1) | Forward to the node 12B |
| TCM TTI(Dest = A, Route = 3) | Forward to the node 12D |

In FIG. 5, the network 10 is illustrated with match/action rules 40, 42, 44 for the nodes 12A, 12F, 12C, respectively, and group tables 50, 52 for the nodes 12A, 12F, respectively. The match/action rules 40, 42, 44 determine forwarding and the group tables 50, 52 determine protection, i.e., which route is taken. Note, if the equipment supports auto-acceptance of RX MSI entries, it is not necessary to specify ODUk tributary slots and tributary port forwarding for the network links. Only the port ID needs to be specified. The nodes 12 can assign tributary slots and tributary port numbers arbitrarily based on what is available. If auto-MSI is not supported, the SDN controller 16 must manage tributary slot/port allocation and make it part of the forwarding rule.

Initially all TCM Routes are considered "valid" either with an active circuit or "unallocated" tributaries. A TCM route is marked invalid under the following conditions: 1) Assigned TCM detects path fault or interface is down, 2) Assigned TCM detects remote defect: i.e., TCM BDI, or 3) The SDN controller 16 has marked the TCM path as invalid. Cross-connection as each of the nodes 12 are unidirectional and created as a result of the local TTI Match and Forward action based on the match/action rules 40, 42, 44 and the group tables 50, 52. Thus, there are no a priori created cross-connects, but rather these are created at the time of creating the connection or at a failure for protection. Cross-connects can removed under the following conditions: 1) MSI value of "unallocated" is received on the given ODUj tributary, 2) Route becomes invalid (terminating node), 3) the SDN controller 16 deletes the match/action entry, or 4) the ODUj TCM fault (standing condition) and local timer expires—optional but useful to free up network bandwidth. Note, removing a cross-connect does not delete the match/action table entry, only the SDN controller 16 can do this. When a cross-connect is removed the MSI value becomes unallocated (as per G.709). This will propagate downstream deleting the downstream cross-connects for the connection.

The above is an exemplary implementation. There are different ways that routes can be validated—autonomously vs. controller. Also, circuit end-points do not need to be ODUj path, i.e., they can be other TCMs or even other network layer information. The primary thrust of the OTN switching systems and methods is using the TTI or some other field as source/destination information to create an automatically switched OTN circuit using match/action rules in an SDN environment.

Figure 6:
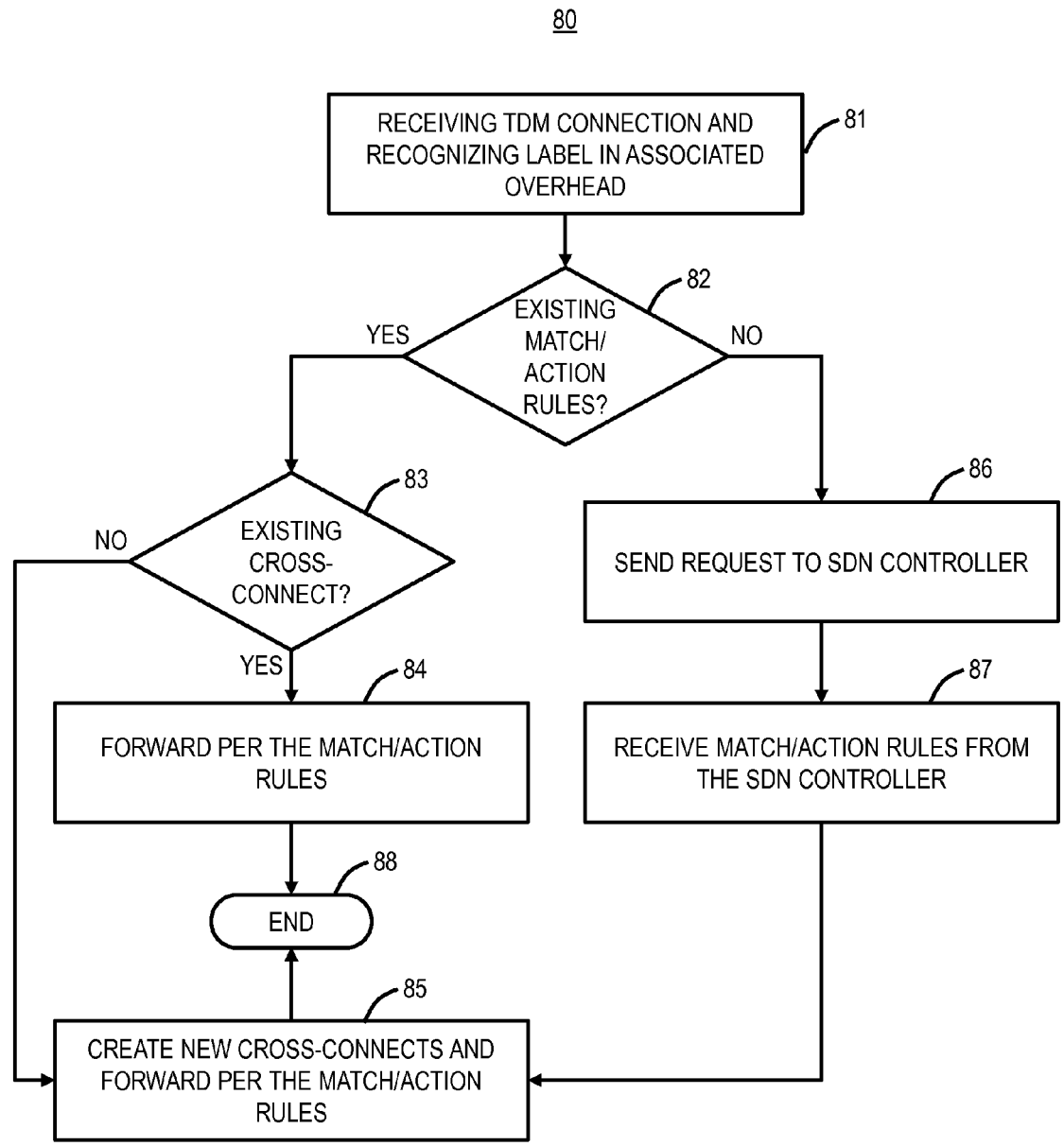
FIG. 6 is a flow chart of a TDM switching method in SDN at a node using match/action rules.

Referring to FIG. 6, in an exemplary embodiment, a flow chart illustrates a TDM switching method 80 in SDN at a node using match/action rules. The TDM switching method 80 contemplates operation at one of the nodes 12 in the network 10 or the like. The TDM switching method 80 includes receiving a TDM connection and recognizing a label in associated overhead (step 81). As described herein, the TDM connection can be an OTN connection and the label can be the TTI (with DAPI, SAPI, etc.). Additionally, the TDM connection can be a SONET or SDH connection with the label being the J0 Section Trace and J1 Path Trace bytes. Note, the TDM switching method 80 contemplates any Layer 1 technique that can include a trail identifier or equivalent. As described herein, the trail identifier (TTI in OTN, J0/J1 in SONET/SDH) is abstractly thought of in a similar manner as the Source and Destination MAC address in Ethernet.

The TDM switching method 80 checks if there are existing match/action rules established for the TDM connection (step 82). Note, in the TDM switching method 80, all forward is done based on match/action rules based on the trail identifier as described herein. If there are existing match/action rules (step 82), the TDM switching method 80 checks if existing cross-connects are provisioned on the node per the existing match/action rules (step 83). If there are existing cross-connects (step 83), the TDM switching method 80 forwards the TDM connection per the match/action rules on the existing cross-connects (step 84). If there are not existing cross-connects (step 83), the TDM switching method 80 includes creating new cross-connects per the match/action rules and forwarding based thereon (step 85). For example, there may not be cross-connects established in the case where the TDM connection was previously set up, but there is a failure on another route, and the TDM connection has been rerouted to the node.

If there are not existing match/action rules (step 82), the TDM switching method 80 includes sending a request to the SDN controller based on the information in the label (step 86). There may not be existing match/action rules in the case of a new connection. The request asks the SDN controller to compute a route and establish associated match/action rules for the various nodes. The TDM switching method 80 includes receiving the match/action rules from the SDN controller based on the request (step 87), and the TDM switching method 80 goes to step 85. Subsequent to steps 84, 85, the TDM switching method 80 ends (step 88).

Figure 7:
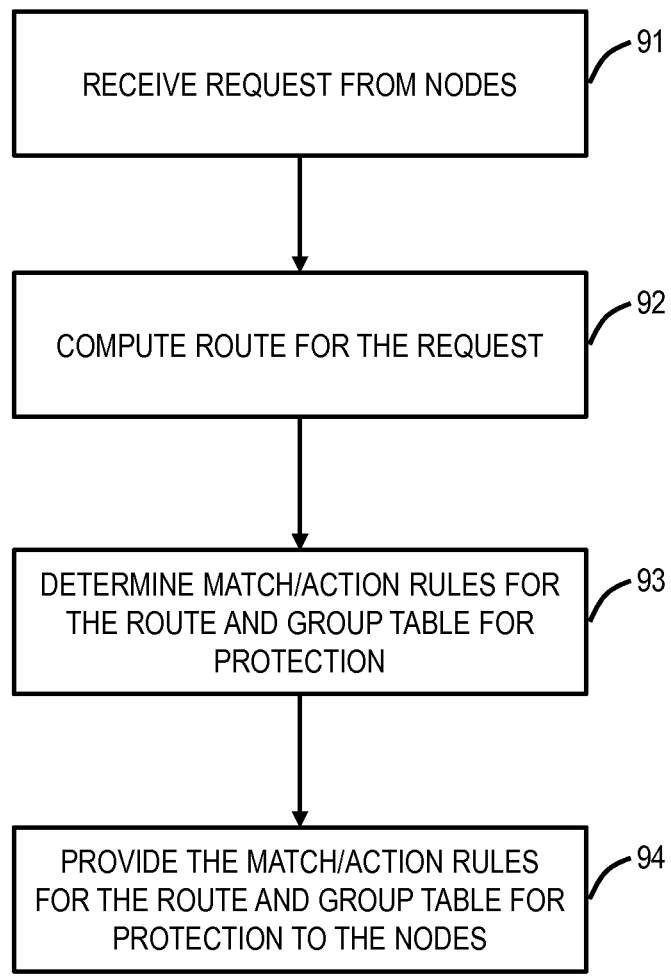
FIG. 7 is a flow chart of a TDM switching method in SDN at an SDN controller.

Referring to FIG. 7, in an exemplary embodiment, a flow chart illustrates a TDM switching method 90 in SDN at an SDN controller. The TDM switching method 90 contemplates operation on the SDN controller 16 in the network 10 or the like, and the TDM switching method 90 can be implemented cooperatively with the TDM switching method 80. The TDM switching method 90 includes receiving a request from nodes in a network (step 91). The nodes provide the request when they receive a new TDM connection without associated match/action rules, i.e., the step 86 in the TDM switching method 80.

The TDM switching method 90 computes a route through the network based on the request (step 92). The SDN controller 16 can use any route computation technique as is known in the art. Note, the SDN controller 16 can determine multiple routes for protection, i.e., 1:N or M:N protection. Once the route(s) is computed, the SDN controller 16 determines match/action rules for the route(s) and group tables for protection (step 93), and then the SDN controller 16 provides the match/action rules for the route(s) and group tables for protection to the nodes (step 94).

Referring to FIG. 8, in an exemplary embodiment, a block diagram illustrates an exemplary node 12 for use with the systems and methods described herein. In an exemplary embodiment, the exemplary node 12 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 12 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 12 can be any digital system with ingress and egress digital signals and switching therebetween of channels, timeslots, tributary units, etc. While the node 12 is generally shown as an optical network element, the systems and methods contemplated for use with any switching fabric, network element, or network based thereon.

In an exemplary embodiment, the node 12 includes common equipment 110, one or more line modules 120, and one or more switch modules 130. The common equipment 110 can include power; a control module; operations, administration, maintenance, and provisioning (OAM&P) access; user interface ports; and the like. The common equipment 110 can connect to a management system 150 through a data communication network 160 (as well as a Path Computation Element (PCE), Software Defined Network (SDN) controller, OpenFlow controller, etc.). The management system 150 can include a network management system (NMS), element management system (EMS), or the like. Additionally, the common equipment 110 can include a control plane processor, such as a controller 200 illustrated in FIG. 9, configured to operate the control plane 130 as described herein. The node 12 can include an interface 170 for communicatively coupling the common equipment 110, the line modules 120, and the switch modules 130 therebetween. For example, the interface 170 can be a backplane, mid-plane, a bus, optical or electrical connectors, or the like. The line modules 120 are configured to provide ingress and egress to the switch modules 130 and to external connections on the links to/from the node 12. In an exemplary embodiment, the line modules 120 can form ingress and egress switches with the switch modules 130 as center stage switches for a three-stage switch, e.g. a three stage Clos switch. Other configurations and/or architectures are also contemplated. The line modules 120 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10GbE PHY), 40 Gb/s (OC-768/STM-256, OTU3, ODU3, 40GbE PHY), 100 Gb/s (OTU4, ODU4, 100 GbE PHY), ODUflex, etc.

Further, the line modules 120 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 120 can include wavelength division multiplexing interfaces, short reach interfaces, and the like, and can connect to other line modules 120 on remote network elements, end clients, edge routers, and the like, e.g. forming connections on the links 120. From a logical perspective, the line modules 120 provide ingress and egress ports to the node 12, and each line module 120 can include one or more physical ports. The switch modules 130 are configured to switch channels, timeslots, tributary units, packets, etc. between the line modules 120. For example, the switch modules 130 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 130 can include Time Division Multiplexed (TDM) (i.e., circuit switching) and/or packet switching engines. The switch modules 130 can include redundancy as well, such as 1:1, 1:N, etc. In an exemplary embodiment, the switch modules 130 provide OTN switching and/or Ethernet switching.

Those of ordinary skill in the art will recognize the node 12 can include other components which are omitted for illustration purposes, and that the systems and methods described herein are contemplated for use with a plurality of different network elements with the node 12 presented as an exemplary type of network element. For example, in another exemplary embodiment, the node 12 may not include the switch modules 130, but rather have the corresponding functionality in the line modules 120 (or some equivalent) in a distributed fashion. For the node 12, other architectures providing ingress, egress, and switching therebetween are also contemplated for the systems and methods described herein. In general, the systems and methods described herein contemplate use with any network element providing switching of channels, timeslots, tributary units, wavelengths, etc. and using SDN to switch TDM connections. Furthermore, the node 12 is merely presented as one exemplary node 12 for the systems and methods described herein.

In an exemplary embodiment, the node 12 can include a network interface communicatively coupled to one or more nodes in a network; a processor communicatively coupled to the network interface; and memory storing instructions that, when executed, cause the processor to: receive a request from a node related to a new Time Division Multiplexing (TDM) connection in the network; determine one or more routes in the network for the new TDM connection; determine match/action rules for the one or more routes at associated nodes of the one or more nodes; if the one or more routes include at least two routes, determine a group table at associated nodes of the one or more nodes to distinguish between the at least two routes; and provide the match/action rules and the group table if the one or more routes include the at least two routes to the associated nodes.

Referring to FIG. 9, in an exemplary embodiment, a block diagram illustrates a controller 200 to provide control plane processing and/or operations, administration, maintenance, and provisioning (OAM&P) for the node 12 or to act as the SDN controller 16. The controller 200 can be part of common equipment, such as common equipment 110 in the node 12, or a stand-alone device communicatively coupled to the node 12 via the DCN 160. The controller 200 can include a processor 210 which is hardware device for executing software instructions such as operating the control plane. The processor 210 can be any custom made or commercially available processor, a central processing unit (CPU), an auxiliary processor among several processors associated with the controller 200, a semiconductor-based microprocessor (in the form of a microchip or chip set), or generally any device for executing software instructions. When the controller 200 is in operation, the processor 210 is configured to execute software stored within memory, to communicate data to and from the memory, and to generally control operations of the controller 200 pursuant to the software instructions. The controller 200 can also include a network interface 220, a data store 230, memory 240, an I/O interface 250, and the like, all of which are communicatively coupled therebetween and with the processor 210.

The network interface 220 can be used to enable the controller 200 to communicate on the DCN 160, such as to communicate control plane information to other controllers, to the management system 150, and the like. The network interface 220 can include, for example, an Ethernet card (e.g., 10BaseT, Fast Ethernet, Gigabit Ethernet) or a wireless local area network (WLAN) card (e.g., 802.11). The network interface 220 can include address, control, and/or data connections to enable appropriate communications on the network. The data store 230 can be used to store data, such as control plane information, provisioning data, OAM&P data, etc. The data store 230 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 230 can incorporate electronic, magnetic, optical, and/or other types of storage media. The memory 240 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 240 may incorporate electronic, magnetic, optical, and/or other types of storage media. Note that the memory 240 can have a distributed architecture, where various components are situated remotely from one another, but may be accessed by the processor 210. The I/O interface 250 includes components for the controller 200 to communicate to other devices. Further, the I/O interface 250 includes components for the controller 200 to communicate with the other nodes, such as using overhead associated with OTN signals.

In an exemplary embodiment, the controller 200 is configured to communicate with other controllers 200 in the network 100 to operate the control plane for control plane signaling. This communication may be either in-band or out-of-band. For SONET networks and similarly for SDH networks, the controllers 200 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 200 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In an exemplary embodiment, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 200 is configured to operate the control plane in the network 100. That is, the controller 200 is configured to implement software, processes, algorithms, etc. that control configurable features of the network 100, such as automating discovery of the nodes 12, capacity on the links, port availability on the nodes 12, connectivity between ports; dissemination of topology and bandwidth information between the nodes 12; path computation and creation for connections; network level protection and restoration; and the like. As part of these functions, the controller 200 can include a topology database that maintains the current topology of the network 100 based on control plane signaling and a connection database that maintains available bandwidth on the links again based on the control plane signaling. The control plane can be distributed control plane; thus a plurality of the controllers 200 can act together to operate the control plane using the control plane signaling to maintain database synchronization. In source-based routing, the controller 200 at a source node for a connection is responsible for path computation and establishing by signaling other controllers 200 in the network 100. For example, the source node and its controller 200 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc.

In another exemplary embodiment, the controller 200 can be the SDN controller 16 which is used, instead of the control plane, to compute paths and establish TDM connections in the network 10. The controller 200, as the SDN controller 16, can be configured to: receive a request from a node related to a new Time Division Multiplexing (TDM) connection in the network; determine one or more routes in the network for the new TDM connection; determine match/action rules for the one or more routes at associated nodes of the one or more nodes; if the one or more routes include at least two routes, determine a group table at associated nodes of the one or more nodes to distinguish between the at least two routes; and provide the match/action rules and the group table if the one or more routes include the at least two routes to the associated nodes.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
    receiving a Time Division Multiplexing (TDM) connection comprising an Optical Transport Network (OTN) connection;
    determining information in OTN overhead of the TDM connection, wherein the information comprises source and destination addressing of the TDM connection and a route included in a Trail Trace Identifier (TTI) in the OTN overhead; and
    if match/action rules defined by a Software Defined Networking (SDN) controller exist for the TDM connection, establishing the TDM connection based on matching an associated rule in the match/action rules with the information, wherein the SDN controller establishes the match/action rules to create and switch the TDM connection.

2. The method of claim 1, further comprising:
    establishing the TDM connection by creating cross-connects for the TDM connection based on the match/action rules.

3. The method of claim 1, further comprising:
    if match/action rules do not exist for the TDM connection, sending a request to the SDN controller for the SDN controller to determine a path and provide the match/action rules.

4. The method of claim 3, further comprising:
    subsequent to the sending the request, receiving the match/action rules from the SDN controller; and
    creating cross-connects for the TDM connection based on the match/action rules.

5. The method of claim 1, further comprising:
    subsequent to the establishing, utilizing a group table to implement protection of the TDM connection at end nodes.

6. The method of claim 1, wherein the information comprises the Trail Trace Identifier (TTI) and associated fields comprising a Source Access Point Identifier (SAPI) and a Destination Access Point Identifier (DAPI).

7. The method of claim 6, wherein the associated fields further comprise an Operator Specific field used to specify a route in the network.

8. The method of claim 1, wherein the information comprises a Multiplex Structure Identifier (MSI) table, and further comprising:
    detecting a new connection based on a presence of new data in the MSI table denoting a connection rate and tributary port number.

9. The method of claim 1, wherein the SDN controller utilizes OpenFlow.

10. The method of claim 1, wherein the TDM connection comprises a Synchronous Optical Network (SONET) or Synchronous Digital Hierarchy (SDH) connection.

11. A Software Defined Networking (SDN) controller, comprising:
    a network interface communicatively coupled to one or more nodes in a network;
    a processor communicatively coupled to the network interface; and
    memory storing instructions that, when executed, cause the processor to:
        receive a request from a node related to a new Time Division Multiplexing (TDM) connection in the network comprising an Optical Transport Network (OTN) connection;
        determine one or more routes in the network for the new TDM connection;
        determine match/action rules for the one or more routes at associated nodes of the one or more nodes;
        if the one or more routes comprise at least two routes, determine a group table at associated nodes of the one or more nodes to distinguish between the at least two routes; and
        provide the match/action rules and the group table if the one or more routes comprise the at least two routes to the associated nodes, wherein the SDN controller establishes the match/action rules to create and switch the TDM connection, and wherein the associated nodes utilize the match/action rules and source and destination addressing and a route of the TDM connection included in a Trail Trace Identifier (TTI) in the OTN overhead of the TDM connection for establishment thereof.

12. The controller of claim 11, wherein the SDN controller utilizes OpenFlow.

13. The controller of claim 11, wherein the new TDM connection comprises a Synchronous Optical Network (SONET) or Synchronous Digital Hierarchy (SDH) connection.

14. A network, comprising:
    a plurality of nodes;
    a plurality of links interconnecting the nodes via Time Division Multiplexing (TDM); and
    a Software Defined Networking (SDN) controller communicatively coupled to one or more of the plurality of nodes;
    wherein each of the plurality of nodes are configured to:
        receive a Time Division Multiplexing (TDM) connection comprising an Optical Transport Network (OTN) connection;
        determine information in OTN overhead of the TDM connection, wherein the information comprises source and destination addressing and a route of the TDM connection included in a Trail Trace Identifier (TTI) in the OTN overhead;

if match/action rules exist for the TDM connection, establish the TDM connection based on matching an associated rule in the match/action rules with the information; and if match/action rules do not exist for the TDM connection, send a request to the controller for the controller to determine a path and provide the match/action rules, wherein the SDN controller establishes the match/action rules to create and switch the TDM connection.

15. The network of claim 14, wherein the controller is configured to:

receive the request related to a new Time Division Multiplexing (TDM) connection in the network comprising an Optical Transport Network (OTN) connection;

determine one or more routes in the network through associated nodes of the plurality of nodes for the new TDM connection;

determine match/action rules for the one or more routes;

if the one or more routes comprise at least two routes, determine a group table to distinguish between the at least two routes; and provide the match/action rules and the group table if the one or more routes comprise the at least two routes to the associated nodes.

* * * * *